United States Patent [19]

Haemmig

[11] 4,083,003
[45] Apr. 4, 1978

[54] VEHICLE LOCATION SYSTEM

[75] Inventor: Adrian B. Haemmig, Silverado, Calif.

[73] Assignee: Products of Information Technology, Inc., Costa Mesa, Calif.

[21] Appl. No.: 675,031

[22] Filed: Apr. 8, 1976

Related U.S. Application Data

[62] Division of Ser. No. 413,039, Nov. 5, 1973, Pat. No. 3,984,807.

[51] Int. Cl.² ............... G08G 1/12; H04B 1/00
[52] U.S. Cl. .......................... 325/6; 325/53; 325/55; 340/23; 340/224
[58] Field of Search .............. 325/4, 6, 55, 53, 64, 325/57, 117, 5; 340/23, 24, 52 F, 224, 416, 167 B

[56] References Cited

U.S. PATENT DOCUMENTS

| | | | |
|---|---|---|---|
| 3,376,509 | 4/1968 | Willcox et al. | 325/53 |
| 3,665,313 | 5/1972 | Trent | 325/55 |
| 3,697,941 | 10/1972 | Christ | 340/23 |
| 3,713,125 | 1/1973 | Miller | 325/64 |
| 3,745,462 | 7/1973 | Trimble | 325/4 |
| 3,757,290 | 9/1973 | Ross et al. | 340/23 |

*Primary Examiner*—Robert L. Griffin
*Assistant Examiner*—Tommy P. Chin

*Attorney, Agent, or Firm*—Knobbe, Martens, Olson, Hubbard & Bear

[57] ABSTRACT

A vehicle location system having a plurality of stationary wayside stations positioned at predetermined geographical locations. The passage of a vehicle near a station references the location of the vehicle at that point in time and automatically supplies the remote headquarters with updated information as to the whereabouts of all vehicles operating in the system. The system enables low power radio frequency signals to automatically communicate error free location information between the wayside station and the vehicle by maintaining the integrity of the signal. Automatic transmission to a remote headquarters of a precoded message such as an emergency communication can be initiated from either the vehicle or a portable transmitter. A common radio frequency channel may be used for transmittal of both audio and digitally encoded messages to and from a plurality of vehicles and a discriminator in each vehicle automatically selects and displays only those digital communications directed to it. Simultaneous automatic transmissions on the same radio frequency channel are avoided by delaying energizing the vehicle transmitter until the preselected channel is open. Unpleasant and distracting noise in the vehicle is minimized by turning off the audio speaker during reception of digitally encoded data.

2 Claims, 8 Drawing Figures

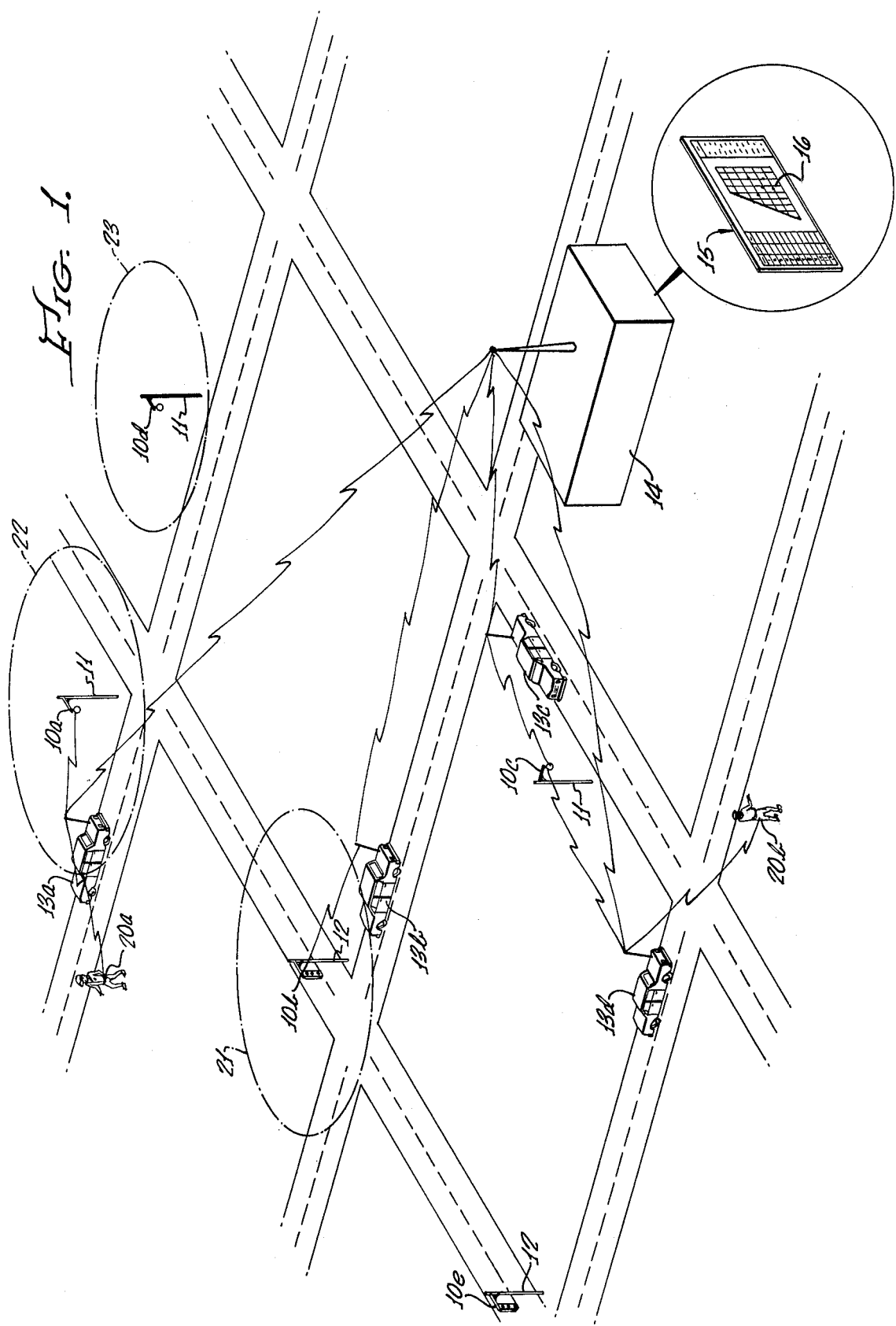

VEHICLE LOCATION SYSTEM

This is a division of application Ser. No. 413,039, filed Nov. 5, 1973 now U.S. Pat. No. 3,984,807.

BACKGROUND OF THE INVENTION

This invention relates to a system for referencing the location of vehicles with respect to a plurality of stationary wayside stations.

There presently exists a need for a reliable economical system for periodically referencing the respective locations of a plurality of vehicles operating in the field. In general, such systems have relied upon the vehicle operator routinely advising a remote headquarters as to his geographical whereabouts. Obvious examples are the policeman in a patrol car and the cab driver. Human problems often interfere with the effectiveness of this type of system. Since people forget or neglect to report their locations, it is not uncommon for a vehicle to be "lost" for all intents and purposes since its location is unknown at a critical time. Also, emergency situations may prevent a patrolman from reporting his location at the very time that updated information as to his location may be the most critical.

Although a number of different kinds of systems have been devised which in theory provide a satisfactory vehicle location system, such systems have either been entirely too expensive for most government and private applications or they have had some inherent insurmountable problems. For example, it has been proposed heretofore to position low power transmitters at predetermined locations and have the vehicle receive a radio frequency signal when it is proximate to such transmitter indicative of the transmitter location. However, such systems have, heretofore, been impractical since the vehicle is constantly moving into and out of fringe reception areas. The number of error signals received is intolerable in these systems and obviously in many instances, inaccurate location information is worse than no information at all.

SUMMARY OF THE INVENTION

In its preferred embodiment, the present invention utilizes a plurality of stationary wayside radio transmitters each periodically transmitting a low power digitally coded message indicative of the geographical location thereof. In addition to a unique geographical location code, this signal also incorporates a start code preceding the station location message and a stop code which follows the station location message. These start and stop codes are keyed to a message verifier system within the vehicle which guard against reception of an erroneous location signal. Unless these start and stop codes correspond to a predetermined known code stored in the message verifier, the message is discarded. By bounding the location message within such start and stop codes, the integrity of the message is safeguarded, whether the vehicle is moving into or out of a fringe receiving area. Thus, when the vehicle is moving in such an area, noise may interfere with reception of a portion of the signal. Such noise however causes errors in the start and stop codes and thus results in the entire message being discarded. Similarly, when the vehicle is entering or leaving the location of a transmitter, a portion of the location message signal may well have noise interference but the same noise also generally causes errors in the start and stop codes. Such errors are detected in the message verifier system which causes the entire message to be discarded.

Upon receipt of a verified location message, the system automatically transmits a message from the vehicle to headquarters including the encoded location message received from the wayside station and in addition a unique vehicle identification code. In the preferred embodiment described herein, the communication may further include a status message entered on a keyboard mounted within the vehicle.

Special precoded messages such as an emergency communication may be transmitted to headquarters in two different ways. Within each vehicle, a keyboard includes one or more keys which when depressed transmit a coded message to headquarters. In addition, a portable transmitter which advantageously may be worn on the belt of a person, includes an actuator switch which, when depressed, transmits a signal to the vehicle. Systems within the vehicle decode this signal and cause an appropriate message to be automatically transmitted to headquarters.

The system of this invention permits operation with a minimum number of communication channels while providing for monitoring the location of a substantial number of vehicles. In the preferred embodiment, the audio and digital messages to and from the vehicle and headquarters are conducted over the same channel without interference. This is accomplished by automatically sensing the presence or absence of a transmitted signal on this channel and delaying transmission from the vehicle until the channel is clear.

The unpleasant and distracting sounds which result when a digital signal is applied to an audio speaker within the vehicle are substantially obviated in the present invention by automatically detecting transmission of a digital signal and turning off the audio speaker circuit during reception of these signals.

Systems constructed in accordance with the present invention not only serve the needs in an urban environment, such as police, fire, cab service and delivery service, but also because of their reliability and relative low cost permit application of a vehicle location system to new and different environments. One such environment, for example, is a large open pit mine in which the system of this invention automatically supplies updated information as to the whereabouts and status of the ore hauling trucks to a remote headquarters.

BRIEF DESCRIPTION OF THE DRAWINGS

FIG. 1 is a perspective view of the system of the invention used as a police patrol car location system, particularly illustrating the relationship between the wayside stations, vehicles, portable transmitters and headquarters;

Figure 2A:
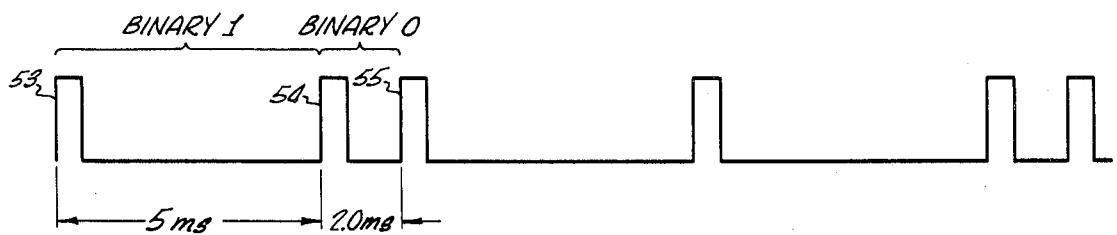
FIG. 2a illustrates graphically the pulse waveforms of a binary one and a binary zero in the exemplary embodiment of the invention.

Overall Description of Patrol Car Location System

Referring to FIG. 1, a plurality of stationary wayside stations 10a, 10b, 10c, 10d and 10e strategically located at predetermined geographical locations. In the specific embodiment described herein of a police patrol car location system, these wayside stations are conveniently mounted to structures already existing in a municipality such as street lamps 11 and stop and go lights 12. As a patrol car 13a, 13b, 13c or 13d is driven past a wayside station, the location of the vehicle is referenced at that point in time by virtue of receiving a low power digitally encoded message from the wayside station. The encoded message corresponds to the geographical location of the wayside station. Advantageously as shown, the encoded location message received by the vehicle is in turn transmitted from the vehicle to a remote headquarters 14 where the message is decoded and presented on a visual display 15. The positions of all patrol cars in use are conveniently displayed on a map 16 of the environment in which the system is installed.

In addition, the system of this invention provides for a portable transmitter 20a, 20b small enough to be conveniently carried on an individual patrolman when he leaves the patrol car. By merely depressing an activator button on the unit, the patrolman is able to transmit to a patrol car such as car 13d and thence over a high power radio frequency link to the remote headquarters 14 a precoded emergency message and last known vehicle location and thus inform headquarters that an emergency condition exists.

The operation of the system of FIG. 1 depends upon limiting the communication paths between the wayside stations 10 and the vehicles 13 so that a vehicle 13 receives a particular encoded location signal only when it is in the proximity of the station sending the signal. A convenient manner for achieving this is to provide each of the wayside stations with a very low power radio transmitter so that the effective radius of transmission is limited to a predetermined distance, for example, some 200 feet, represented by numerals 21, 22 and 23. Advantageously, this transmitted low power level at each wayside station may be adjusted to conform to the particular location of the wayside station. Thus, the transmitted power levels of stations 10a and 10b whose respective signals 21, 22 must be received by vehicles traveling along a pair of intersecting streets should be higher than station 10d whose signal 23 need only blanket the street area immediately adjacent this wayside station.

Such low power transmission as is provided by the wayside station 10 ordinarily produces serious communication problems since a driven vehicle 13 is constantly entering and leaving a fringe area of reception at the outer periphery of the radio transmitter zones, e.g. 21, 22 or 23; during which time noise may produce significant error signals. A significant feature of this invention is that these errors are successfully detected by a message verifier system located within each vehicle 13 so as to avoid transmitting erroneous location messages to the headquarter display 15.

Figure 3:
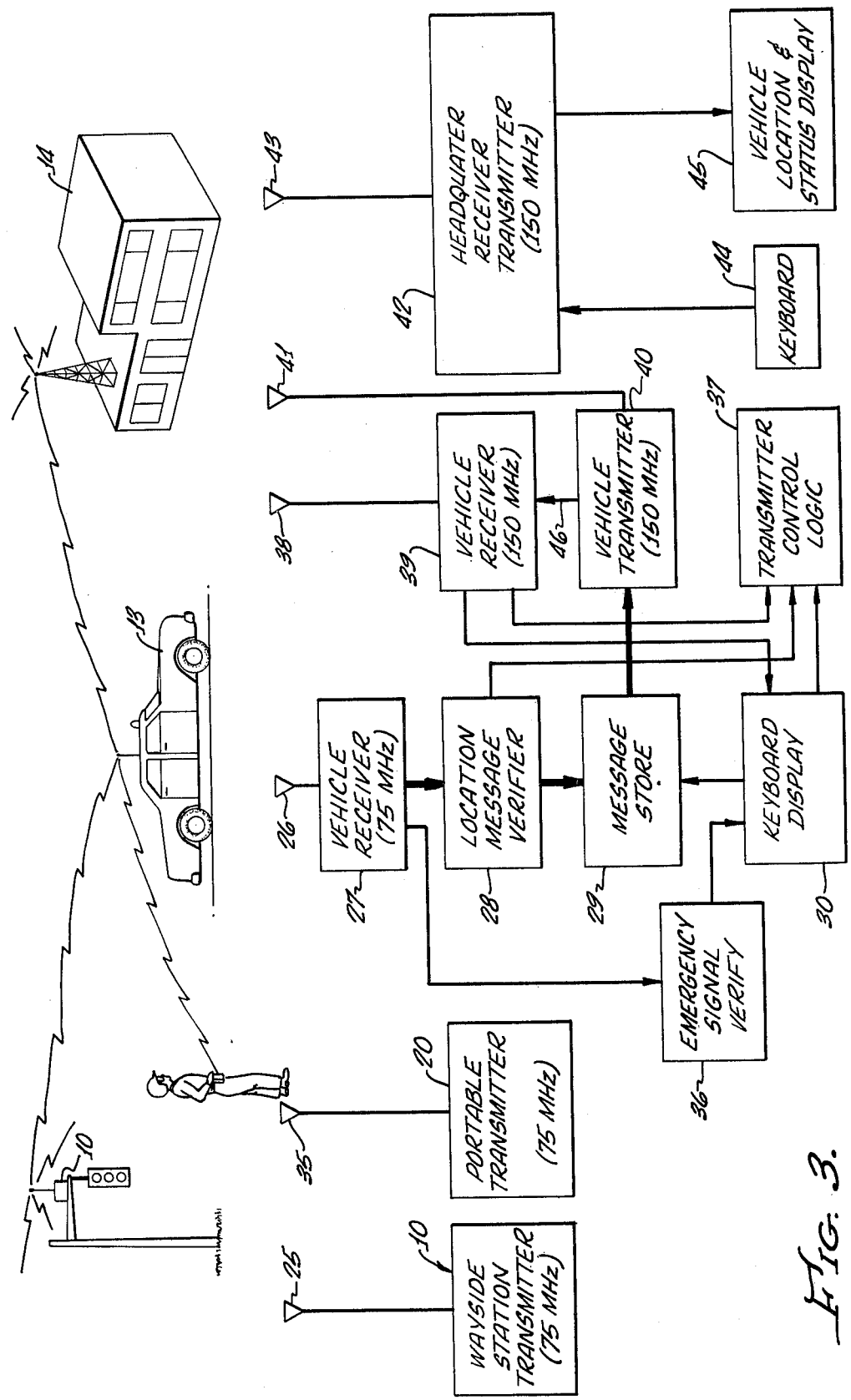
FIG. 3 is a simplified block diagram of the exemplary embodiment of this invention, particularly illustrating the communication paths connecting the wayside stations, vehicles, emergency transmitters and headquarters.

As shown in FIG. 3, the wayside station 10 includes a low power 75 MHz radio transmitter coupled to an antenna 25. A vehicle within receiving range of this antenna receives a digitally encoded location message transmitted from the wayside station 10 on vehicle mounted antenna 26 coupled to a 75 MHz receiver 27. The validity of each received location message is determined in the location message verifier 28 and a valid location is retained in message store 29. Message store 29 also retains any status communication selected by the patrolman on the keyboard-display 30.

The portable transmitter 20 advantageously operates on the same 75 MHz radio channel to provide on its antenna 35 a signal received on the vehicle antenna 26. The precoded message provided by the portable transmitter is verified by the emergency signal verify 36 which automatically actuates the keyboard-display 30.

Messages encoding the vehicle location, vehicle number and status are automatically transmitted from the vehicle 13 to headquarters 14 over another communications link which in the exemplary embodiment is a 150 MHz radio channel. These messages are automatically transmitted whenever: (i) an updated location message is contained in message store 29, (ii) the patrolman activates the portable transmitter 20, or (iii) the patrolman actuates his keyboard-display unit 30 within the vehicle. When any one of these events occurs, a signal is supplied from either the location message verifier 28 or the keyboard-display 30 to the transmitter control logic 37. This logic is also responsive to the presence of another 150 MHz signal on vehicle mounted antenna 38 and received by vehicle mounted receiver 39 so that the 150 MHz vehicle transmitter 40 is keyed-on only when the 150 MHz channel is clear. The data stored in the message store 29 is then transmitted from antenna 41 to headquarters 14 on the 150 MHz channel. While transmitter 40 is keyed-on, a signal on lead 46 turns off vehicle receiver 39.

Communications from the headquarters 14 to vehicles 13 are provided via headquarters 150 MHz receiver-transmitter 42 which transmits over antenna 43 a signal received on the antenna 38 of all patrol vehicles. Encoded communications are selected by the dispatcher at headquarters on keyboard 44. These messages are received on the vehicle receiver 39 and displayed on vehicle keyboard-display 30. The encoded location and status messages transmitted from the vehicle are displayed on the headquarters vehicle location and status display 45.

For convenience, the 150 MHz receiver 39 and transmitter 40 and their respective antennas 38 and 41 are shown as separate elements herein. It will be understood that combinations of these units are commercially available as transceivers. Also, a single antenna installed on the vehicle would ordinarily be used to both transmit and receive the 150 MHz radio signals.

In the exemplary embodiment, the wayside stations include individual radio transmitters which produce low power signals received on vehicle mounted antenna 26. Another embodiment of the invention not shown includes a low power transmitter mounted on each vehicle for transmitting the vehicle identification numbers and status to receivers located at each wayside station. Passage of a vehicle proximate to a wayside station automatically provides an updated location message back to headquarters 14. In such embodiment the location message verifier 28 is located at the wayside station 10 rather than in the vehicle 13 and operates in an identical manner as described below to protect the integrity of the signal, especially when the vehicle and wayside station are so situated as to result in fringe reception at the wayside station receiver.

It will further be apparent that this invention is not limited to a system in which radio links provide the entire communication path from the wayside station or vehicle to the headquarters. The invention may, for example, be used advantageously in systems wherein the communication links between the vehicle and wayside station are wireless paths subject to interference and substantially attenuated when any appreciable distance separates the vehicle from the wayside station. Thus, modulated light waves encoding a digital message may transmit information between the vehicle and wayside station. Telephone lines may be used to transmit messages between the wayside station and the remote headquarters. Although specific radio frequencies are given herein for exemplary purposes, it will be understood that these values are exemplary values and specific channels will be generally determined by the availability of frequencies in accordance with the F.C.C. regulations.

DETAILED DESCRIPTION OF WAYSIDE STATION

Figure 4:
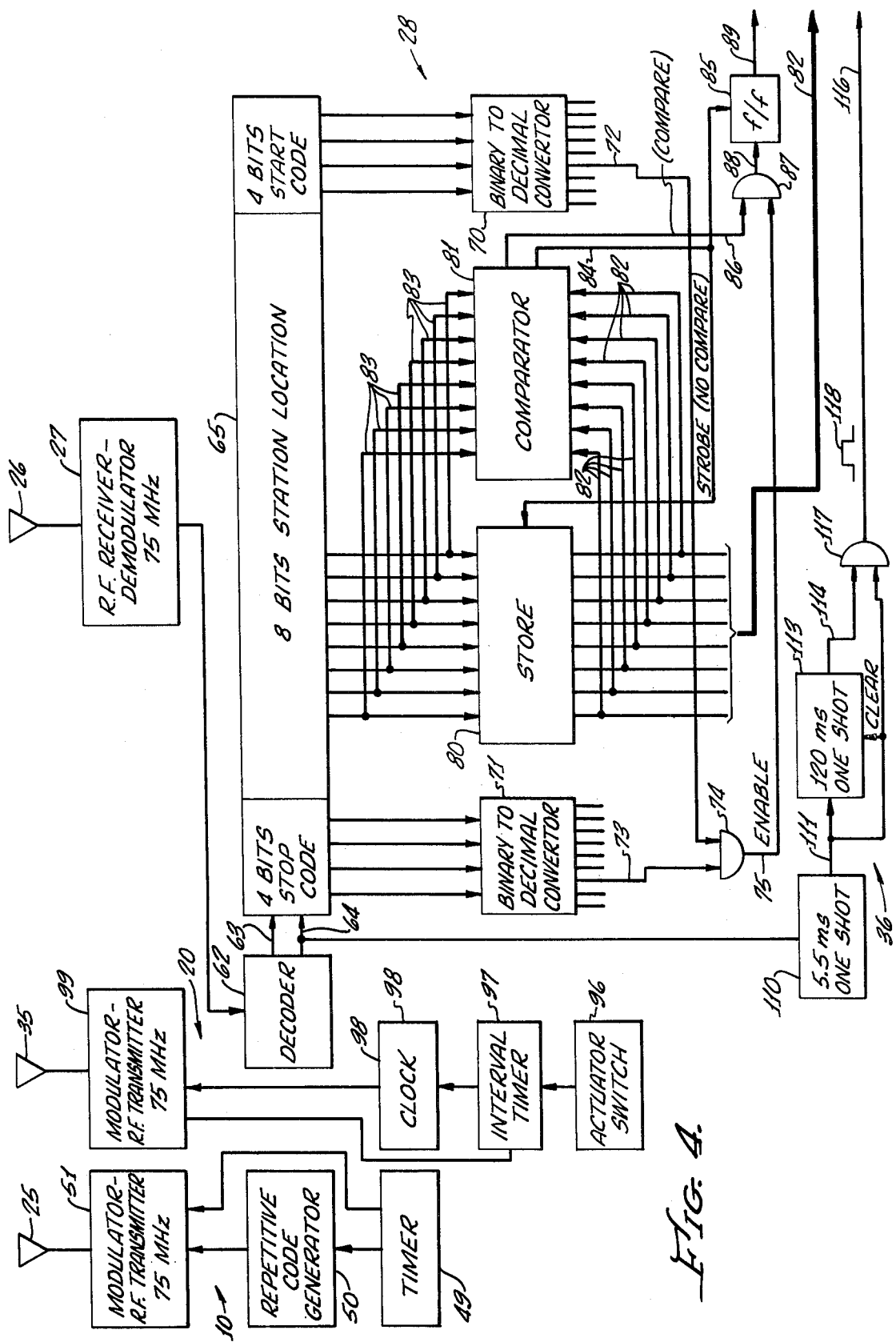
FIG. 4 is a detailed block diagram of the wayside station, emergency transmitter and message verifier portions of a vehicle location system constructed in accordance with this invention.

As shown in FIG. 4, each wayside station 10 includes a timer 49 periodically activating repetitive code generator 50 and low power 75 MHz RF modulator-transmitter 51. When generator 50 and modulator-transmitter 51 are activated, a digitally coded message produced by generator 50 is transmitted over the 75 MHz channel on antenna 25.

Figure 2B:
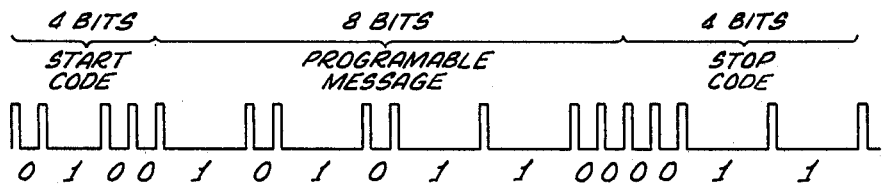
FIG. 2b is a graphical representation of the digitally encoded waveform generated at a wayside station.

Exemplary encoded waveforms produced by the repetitive code generator 50 are shown in FIGS. 2a and 2b. As shown in FIG. 2a, binary ones and zeros are distinguished by the time spacing between the leading edges of a pulse train. Thus, a 5 millisecond spacing between the leading edges 53, 54 of adjacent pulses defines a binary one whereas a 2 millisecond spacing between the leading edges 54, 55 defines a binary zero. The respective pulses are typically ½ millisecond long.

Respective binary ones and zeros are combined to provide an encoded signal from each wayside station 10 shown in FIGS. 1, 3 and 4. As shown in FIG. 2b, the eight bits defining a digitally encoded location message are accompanied by a predetermined digital code pattern which in the exemplary embodiment comprises an initial four bits defining a start code and a following four bits defining a stop code. In general, the start and stop codes will be common to all wayside stations, whereas a pre-programmed wayside station location is indicative of a unique geographical location. Thus, the complete encoded message shown in FIG. 2b communicates both the location of the station and a binary coded signal common to all stations. As described below, the coding of the start and stop codes is keyed to a location message verifier 28 (FIGS. 3 and 4) within the vehicle so as to guard against reception of an erroneous location signal. This is particularly important in a vehicle locating system in which, as shown in FIG. 1, the vehicles are constantly moving within a fringe receiving area.

After transmission of the encoded signal of FIG. 2b, the modulator-transmitter 51 is caused to be turned off by the timer 49 for a predetermined time interval. This interval and the transmission radius of the wayside station are selected so that any vehicle operating at its maximum velocity past a station will receive at least two complete coded messages.

Detailed Description of Message Verifier System

The encoded message of FIG. 3 is received on vehicle mounted antenna 26 (FIG. 4) coupled to the 75 MHz RF receiver and demodulator 27 mounted within the vehicle. The demodulator output signal is connected to a decoder 62 which distinguishes between an encoded binary one and a binary zero. A common form of decoder 62 produces a series of clock pulses on one output 63 with the presence or absence of a pulse on a second output 64 in time coincidence with a clock pulse indicative of a binary one or zero. Such decoders are common in the art and therefore are not shown in further detail in the Figure.

The output of the decoder 62 is coupled to the location message verifier 28 which includes a multiple stage, serial load shift register 65 adapted to hold the entire message from the repetitive code generator 50. As shown, the shift register 65 includes a four stage storage capacity for the four start bits, an eight stage storage capacity for the eight bits wayside station location message and a four stage storage capacity for the four bits of stop code.

After an entire message has been entered into the shift register 65 in serial fashion, the entire message is analyzed in parallel fashion to detect whether or not the received signal is a true or erroneous signal. The four stages storing the four bits of the start code are respectively connected to a first binary-to-decimal converter 70. Similarly, each of the four stages storing the four bits of the stop code are connected to a second binary-to-decimal converter 71. Each of the converters 70, 71 convert the code pattern registered in the start and stop stages of shift register 65 into another code format. Thus, these converters have respective unique outputs 72 and 73 coupled to an AND gate 74. These unique outputs correspond to a pair of numbers programmed at and common to all of the repetitive code generators 50. Thus, in the exemplary message shown in FIG. 3, the start code bits in the binary 0100 pattern digitally encoded the decimal number 4 and the stop code bits in the binary 0011 pattern digitally encode the decimal number 3. Each time these start and stop codes are received and stored in the first four and last four stages of the shift register 65, binary-to-decimal converter 70 supplies a signal on its output 72 corresponding to the decimal digit 4 and binary-to-decimal converter 73 supplies a signal on its output 73 corresponding to the decimal digit 3. Simultaneous energization of output 72 and 73 provide an "enable" signal at the output 75 of AND gate 74. As described below, the location message in the shift register is discarded if no signal appears at this enable output.

The operation of the location message verifier 28 so far described for protecting the integrity of the transmitted message may be appreciated by assuming that the vehicle 13 is in a fringe receiving area during a portion of the time interval in which the message is transmitted by the wayside station and received by the vehicle. In this hypothetical situation, noise pulses may erroneously result in a message being stored in the shift register in which the first four bits encode a start code number other than four and/or the last four bits encode a stop code number other than 3. In such instance, no output signal is supplied to output 72 and therefore no enable signal apppars on AND gate output 75.

Quite conceivably, the noise which causes an error in the start or stop code also produces an error in the station location message. However, such erroneous location message is discarded by virtue of there being no enable signal produced at output 75. Since the vehicle 13 is normally in a fringe receiving area because it is moving toward or away from a wayside station 10, the error detector system described will guard against errors in both situations. Thus, when a vehicle is in a fringe area, a portion of the message may contain errors. Such errors are avoided by use of the start and stop codes. It is extremely unlikely that the vehicle is so located that the start and stop codes would be received without error and the intervening station location message received without errors.

The signal integrity may be further protected by store register 80 and digital comparator 81. These components provide still an additional message verify system which is not a part of the present invention but rather is disclosed and claimed by Adrian B. Haemmig and James A. Gibson in the copending application, entitled "Improvements in Vehicle Locating Systems", filed herewith, and assigned to Products of Information Technology, Inc., assignee of the present invention. As described therein the function of these elements is to inhibit utilization of the location message unless and until two identical location messages are received in succession. The store register 80 is connected in parallel with the eight stages of the shift register 65 which contain the station location information. This data is retained in the store register 80 and supplied over plural leads 82 to one set of inputs of comparator 81 until receipt of the succeeding message from the wayside station 10. At such time, the output of the previous station location message, now retained in the store register 80, is compared with the current station location message located in the shift register 65 and supplied over plural leads 83 to a second set of inputs of comparator 81. If the combination of 8 bits in both the store register 80 and shift register 65 do not compare, there is a signal applied to the strobe (no compare) output 84 of the comparator 81 for entering the shift register location information into the store register 80. This signal also resets transmission enable flip flop 85. If, however, the presently received location message is identical to the previously received message, a signal is applied on the compare output 86 to AND gate 87. AND gate 87 is also responsively connected to the enable output 75 so that simultaneous energization of the compare lead 86 and enable output 75 result in a signal on the output 88 of AND gate 87 which triggers the flip flop 85. Flip flop 85 when triggered supplies a signal over lead 89 to initiate automatic transmittal of an updated vehicle location message from the vehicle to headquarters as described below.

It will be understood that the operation time of the logic elements described above is very short, e.g. a few hundred nanoseconds at most, in comparison with the milliseconds of time taken to shift each binary bit of information into the shift register 65. Thus, once the binary converters 70, 71 detect a proper start and stop codes in the shift register 65, they are able to apply a signal to the output of enable gate 74 for automatically initiating transmittal of a vehicle location message to headquarters as described below well within the time interval that the digital data is retained in the store register 80.

Portable Transmitter

Figure 5:
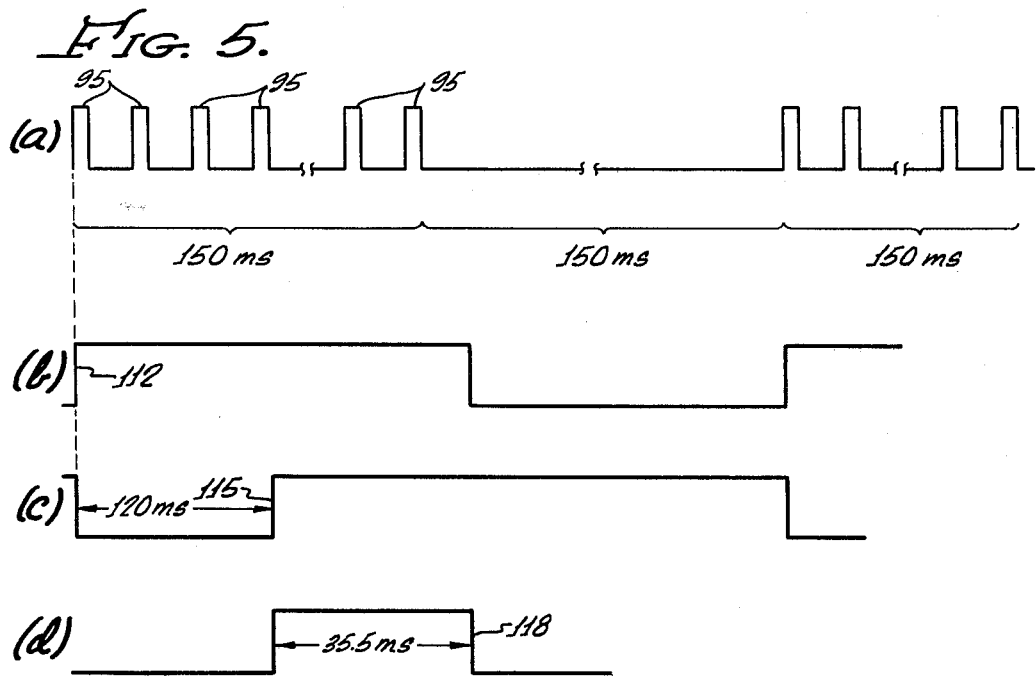
FIG. 5a illustrated graphically the pulse waveform of an emergency call from the emergency transmitter to the patrol car.
FIG. 5b, 5c and 5d illustrate waveforms within the portion of the system of FIG. 4 for decoding an emergency call.

The portable transmitter 20 when activated transmits a chain of uniformly spaced binary one (FIG. 5) pulses 95 for a predetermined length of time. In the specific embodiment shown in FIG. 4, these pulses are generated by clock 98 when the activator switch 96 is depressed, causing a 150 millisecond interval timer 97 to run and supply the burst of binary one pulses 95 shown in FIG. 5 to the 75 MHz modulator-transmitter 99 for the 150 millisecond period. These pulses modulate a 75 MHz carrier signal supplied to antenna 35. At the end of this 150 millisecond time interval, there is a time interval of 150 milliseconds followed by a second burst of pulses as shown in FIG. 5. After a plurality of such pulse bursts, the timer 97 shuts off and terminates the flow of pulses from the clock 98 and also shuts off the transmitter 99 so that no additional signals are transmitted from the modulator-transmitter 99 until the switch 96 is again actuated. At such time, the unit is recycled and an identical series of pulse bursts are generated and transmitted on a 75 MHz carrier.

Reception of Signal From Portable Transmitter

The modulated pulses generated by the portable transmitter are received on antenna 26 of any vehicle mounted receiver 27 located within the receiving range of the emergency transmitter. The signal is demodulated in receiver 27 and supplied to decoder 62 which, as described above, produces a pulse on output 64 for each binary one bit.

These pulses are supplied to the emergency signal verify logic 36 so that the first such pulse triggers a retriggerable 5.5 millisecond one shot multivibrator 110, thereby providing a voltage rise at its output 111 as indicated by waveform 112 of FIG. 5b. So long as the train of binary one pulses is supplied to the input of the retriggerable 5.5 millisecond one shot multivibrator 110, its output remains at its high level as shown in FIG. 5b.

The voltage pulse on output 111 in turn triggers the 120 millisecond one shot multivibrator 113. Unless previously cleared, this latter multivibrator will automatically reset at the end of 120 milliseconds resulting in a voltage rise at its output 114 as shown by waveform 115 in FIG. 5c. During the interval that the voltage levels on both of the outputs 111 and 114 are high, the voltage level on the output 116 of AND gate 117 is also high as shown as waveform 118 in FIG. 5d. Since the pulse burst from the portable transmitter 20 continues for some 30 milliseconds after the one shot 113 has reset, the pulse 118 has a duration of some 35.5 milliseconds equal to sum of the 30 milliseconds interval and the 5.5 millisecond period of one shot multivibrator 110. As described below, this pulse may, for example, function as an emergency transmit control signal and is supplied at the operator keyboard 30 to activate the same circuitry that is activated when the operator in the patrol car depresses a key for transmitting a precoded message from the vehicle to headquarters. Typically, this message is reserved for the 10-999 or emergency message.

The portable signaling system is such that the pulse burst 95 received from the transmitter 99 will uniquely produce the 35.5 millisecond pulse 118 at the output of AND gate 117. Thus, for example, any train of pulses received from another source, e.g. such as a wayside station, containing any binary zeros will cause a time interval greater than 5.5 milliseconds between the successive pulse inputs to the 5.5 millisecond one shot 110. If a pulse is not received by one shot 110 within 5.5 milliseconds, this one shot resets causing the voltage at its output to change and this voltage change is supplied via output 111 to the clear input of the 120 millisecond one shot causing it also to be reset. As a result, only a steady train of binary one pulses for a period of time longer than 120 milliseconds will provide the requisite pair of high inputs to the AND gate 117 necessary to produce a signal on output 116.

It will also be seen that the message verify system of FIG. 4 will inherently screen out the portable transmitter signal. Thus, although the binary one pulses on decoder output 62 will continue to fill up the shift register 65, binary ones in its start and stop stages will each encode the decimal number 15, a number in excess of the output of either of the binary-to-decimal converters 70, 71. Accordingly, the portable transmitter signal (as with any other series of bits not having a proper start and stop code) will not cause a false location message to be sent from the vehicle.

Vehicle Message Transmitter System

Figure 6:
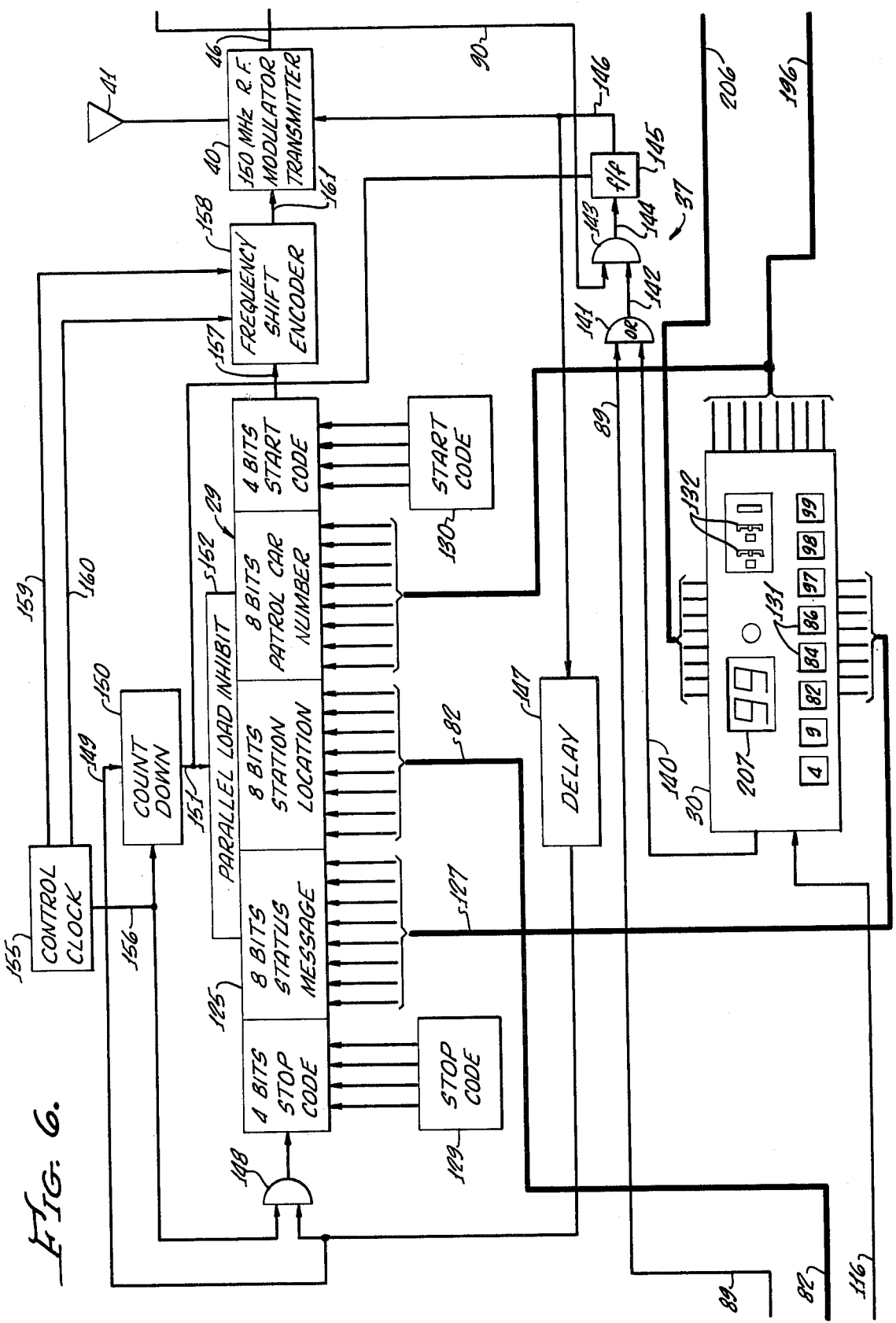
FIG. 6 is a detailed block diagram of the vehicle message transmission portion of a vehicle location system constructed in accordance with this invention.

The system for transmitting the location message and other information from the vehicle 13 to the headquarters 14 is shown in FIG. 6. The message store 29 comprises a multiple stage, parallel-load shift register 125. Eight stages of this register are parallel loaded with the encoded data in store register 80 over plural leads 82. As described above, this data comprises eight bits of digitally encoded information corresponding to the vehicle location as received from the wayside station. The remaining portion of the shift register 125 is advantageously divided into a predetermined number of stages for a status message and the patrol car number. In the exemplary embodiment shown, each of these portions also store eight bits of coded information. The data communicating a status message and patrol car number are supplied from the keyboard 30 located in the vehicle over respective multiple leads 127 and 128. The integrity of the message transmitted from the vehicle to the headquarters 14 is protected by a start code and a stop code in the same manner as described hereinabove. Thus, these 24 message stages are bounded by four stages of the shift register 125 loaded from a stop generator 129 and four stages loaded from a start code generator 130.

The status message derived from the keyboard 30 is either selected by depressing the appropriate button or buttons on the keyboard or in the case of an emergency message received from the portable transmitter, is automatically provided each time the emergency signal transmit control pulse 118 is supplied at the output 116 of AND gate 117 (FIG. 4). The keyboard 30 advantageously includes a plurality of keys 131 each selecting a precoded message. In the exemplary embodiment shown, representative precoded status messages from the patrol field officer in the vehicle dispatcher at headquarters include:

| | |
|---|---|
| 10-4 | O.K.; Acknowledgement |
| 10-9 | Repeat Last Message |
| 10-82 | Transmit on Channel 2 |
| 10-84 | Field Check |

-continued

| | |
|---|---|
| 10-86 | Send Back-Up Unit |
| 10-97 | Arrived At Scene; Officer Leaving Mobile Unit |
| 10-98 | Leaving Scene, In Service, Available for Assignment |
| 10-99 | Dispatcher Alert; Contact Officer Via Radio; Or Emergency Conditions |

The patrol car number is also supplied from the manual keyboard 30. Advantageously this number may be manually dialed by the officer on a pair of thumbwheel knobs 132 to distinguish his vehicle from the other vehicles currently in use. As described below, this number also serves to discriminate between communications received from headquarters so that the only messages displayed on keyboard readout 207 are those directed by the headquarters dispatcher to a particular vehicle or vehicles.

Transmittal of the information stored in shift register 125 from the vehicle 13 to the headquarters 14 is initiated in the following manner: A signal rise occurs at the output 89 of the transmit enable flip flop 85 (FIG. 4) when this flip flop is triggered to its "set" state. A signal rise also occurs on lead 140 from the keyboard 30 when the operator selects one of the keys 131 or when an emergency signal produces a pulse 118 on lead 116. Leads 89 and 140 are connected to respective inputs of OR gate 141. Thus, a signal rise from flip flop 85 or keyboard 30 at the input of OR gate 141 will produce a corresponding signal rise on the output 142 of OR gate 141 which is supplied as one of the inputs of AND gate 143. The other input 90 of this AND gate is responsive to the presence of another radio signal being transmitted on the same 150 MHz radio channel. In the exemplary embodiment described herein, this information is derived from the squelch circuitry within the vehicle radio receiver 39 (FIGS. 3 and 7) tuned to the 150 MHz channel. If no other 150 MHz signal is present, a signal rise from either the enable flip flop 85 or officer keyboard 30 on lead 140 causes a signal to appear at the output 144 of AND gate 143 and set the transmitter control flip flop 145.

The output 146 of transmitter control flip flop keys on the 150 MHz radio frequency transmitter 40 and is also applied through a signal delay network 147 to the input of shift register control AND gate 148 and to the enable input 149 of count down counter 150. A signal applied to counter input 149 "enables" this counter and results in application of a signal to the parallel load inhibit portion 152 of the shift register 125. Accordingly, as long as the count down counter 150 is enabled, parallel loading of the register 125 is inhibited.

The encoded data stored in the shift register 125 is shifted out in serial format to the transmitter 40 in the following manner: A control clock 155 has one output 156 connected to another input of shift register control AND gate 148. As noted above, the other input of this AND gate is connected to the output of transmitter control flip flop 145. Thus, when this flip flop is set, pulses from the clock 155 are applied to the clock input of shift register 125, resulting in a serial shifting out of digital bits on shift register output 157. Each clock pulse causes one data bit to be applied to the input of a frequency shift encoder 158. Thus, the first data removed are the four start code bits and the last data removed are the four stop code bits.

Encoder 158 is supplied with two different frequency signals from the control clock 155 over leads 159 and 160 to provide a signal on output 161 which shifts from one frequency to the other corresponding to whether the bit is a binary one or zero. This frequency shift signal on output 161 is applied to the 150 MHz radio frequency modulator-transmitter 40 where it modulates the 150 MHz carrier for transmittal on antenna 41.

During the entry of clock pulses into the shift register 125, the count down counter 150 counts down to zero. In the example shown, this counter is preset to the number 32, the data bit capacity of the register 125. Thus, when 32 clock pulses have been applied to the input of this counter, all of the bits in the shift register 125 will have been serially shifted out on output 157. Receipt of 32 clock pulses cause the counter 149 to remove the inhibit signal on lead 151 to the parallel load inhibit portion 152 of the shift register 125 and also reset transmitter control flip flop 145. The shift register 125 is then free to accept new data from the store register 80 (FIG. 4) and the officer keyboard 30.

The signal delay network 147 delays transmittal of the enabling signal from flip flop 145 to the AND gate 148. This delay, typically 375 milliseconds, is selected longer than the warm up time of the transmitter so as to insure that the transmitter is on a full power for transmission of a message from the vehicle to the headquarters. During the interval after the transmitter has been turned on but before a signal appears at the output of delay network 147, the 150 MHz transmitter 40 transmits a radio frequency signal at whichever of the clock frequencies on leads 159, 160 is tuned the high Q resonant circuit 171 (FIG. 7) in the 150 MHz radio receiving stages of the other vehicles and headquarters. As described below this high Q circuit is used to automatically disconnect the vehicle audio speaker during transmission of a data signal. Delay network 147 thus insures that the high Q circuit in each vehicle and at headquarters is operative before the AND gate 148 is enabled.

As described and claimed in the copending application, entitled "Improvements in Vehicle Locating Systems", identified hereinabove, the comparator 81 and enable flip flop 85 shown in FIG. 4 and transmitter control flip flop 145 shown in FIG. 6 provide an efficient utilization of the 150 MHz channel by limiting automatic transmission of location messages to updated information. As described in this copending application, flip flop 145 is edge triggered, i.e. it is triggered to its "set" state only when a signal rise occurs on input lead 144. Such a signal rise occurs when flip flop 85 is "set" and does not reoccur on lead 89 until flip flop 85 has first been reset by a signal on the comparator output "strobe" lead 84 (FIG. 4) and subsequently triggered to its "set" state by a "compare" signal on comparator output 86. As a result, so long as the location information in store 80 remains unchanged, the flip flop 85 is retained in its "set" state and no signal rise occurs on lead 89 to trigger flip flop 145.

Reception of Audio and Digital Encoded Messages From Headquarters

Figure 7:
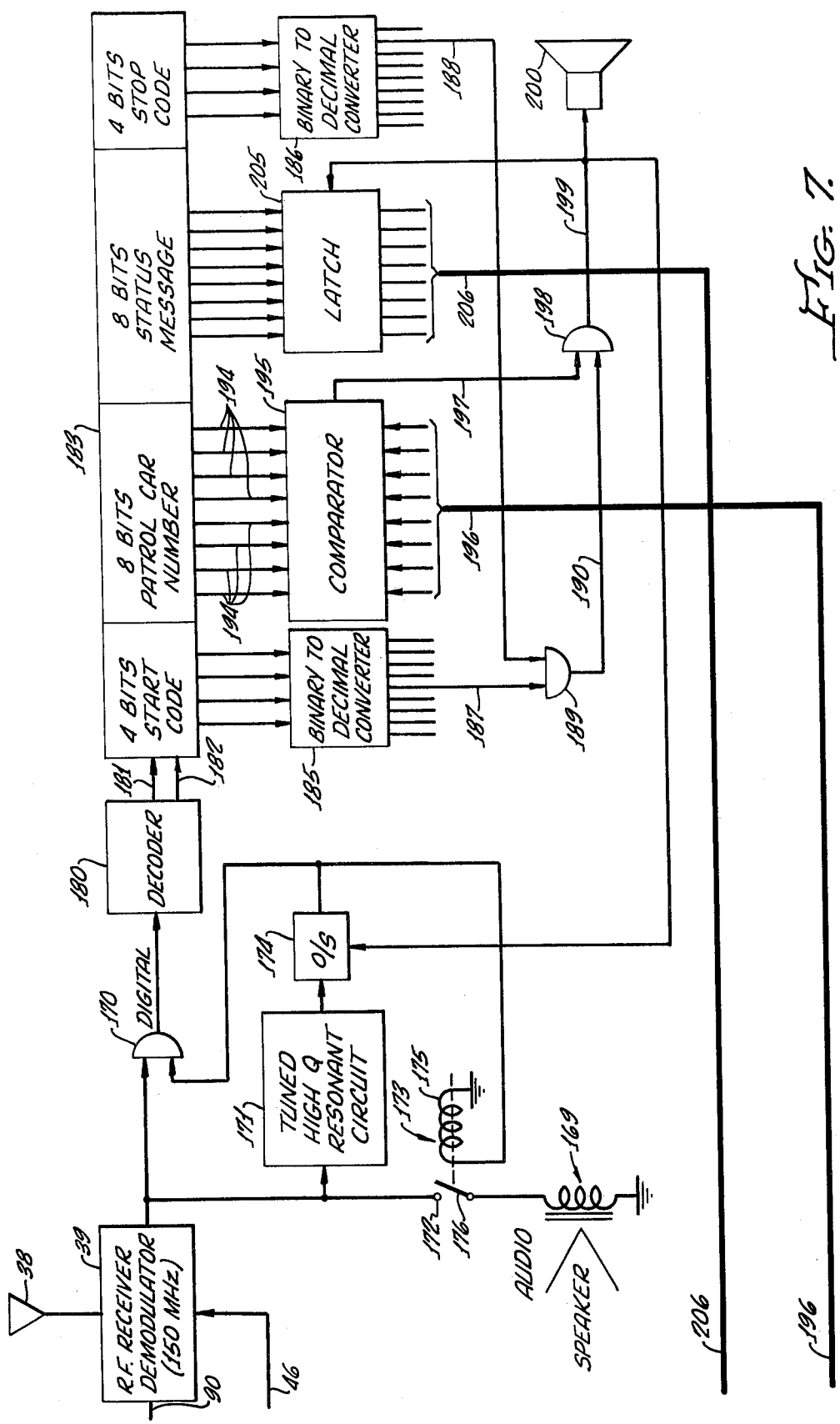
FIG. 7 is a detailed block diagram of the vehicle message receiving portion of a vehicle location system constructed in accordance with this invention.

Referring to FIG. 7, each patrol car carries an RF receiver-demodulator 39 tuned to the headquarters transmitter frequency of 150 MHz. This receiver-demodulator advantageously includes what is well known in the art as a squelch system which distinguishes between a carrier signal on the 150 MHz channel and high frequency noise. The operation of this squelch circuitry is such as to provide a signal on lead 90 when the squelch is operative indicative that the 150 MHz channel is clear.

The manner in which the audio speaker is automatically disconnected during receipt of a digital data signal is as follows: The output of the RF receiver-demodulator 39 is coupled to a first input of AND gate 170, the input of a tuned high Q resonant circuit 171 and one side (terminal 172) of a single pole, single throw switch relay 173. The tuned high Q resonant circuit 171 in each vehicle is tuned to the clock frequency transmitted from the vehicle transmitter 40 during the interval between when the transmitter is keyed on and an enable signal appears at the output of delay network 147 (FIG. 6). Each data transmission over the 150 MHz channel from any vehicle as well as headquarters is preceded by this tone which results in energization of the tuned high Q resonant circuit and triggering of one shot multivibrator 174 to supply a signal to a second input of AND gate 170 and also apply a signal to relay coil 175 to disconnect movable relay contact 176 from terminal 172. The period of one shot multivibrator 174 is sufficiently long so to energize the relay 173 for the length of time that a digital signal is applied to antenna 38. The movable contact 176 of relay 173 is adapted to open or close the path from the RF receiver-demodulator 39 to the audio speaker 169. Energizing relay 173 thus disconnects a digitally encoded message on the 150 MHz channel from the loudspeaker in the patrol car so as to avoid compelling the occupants of the vehicle to listen to the unpleasant and distracting noise which would otherwise result from the digital information transmitted over the 150 MHz band. Accordingly, a common radio channel may be used for both digital and audio information without inconveniencing the vehicle occupants.

Received encoded messages from headquarters are temporarily stored and verified as follows: The output signal from the one shot multivibrator 174 enables the AND gate 170 so as to supply the demodulated signal from the receiver-demodulator 39 to the input of the decoder 180. Decoder 180 supplies a train of clock pulses on one of its outputs 181 and a series of pulses on its other output 182 corresponding to binary ones. Accordingly, the presence or absence of a pulse on output 182 in time coincidence with a clock pulse determines whether a binary one or zero is serially shifted into the multiple stage, serial load shift register 183. This register includes four bits of storage capacity for a start code, eight bits of storage capacity for the patrol car number and eight bits of storage capacity for the dispatcher status message selected on keyboard 44 (FIG. 3), and four bits of storage capacity for the stop code.

Binary-to-decimal converters 185 and 186 are respectively coupled to those stages of shift register which encode the start and stop codes. These converters function in the manner described hereinabove to protect the integrity of the signal received from the headquarters transmitter 42 (FIG. 3). Thus, only when the appropriate start and stop codes are contained in the headquarters message are signals applied to both of the converter outputs 187 and 188 to provide a signal at the output 190 of AND gate 189.

Those stages of shift register 183 which hold the encoded patrol car number are supplied as plural inputs 194 to a digital comparator 195. Another set of inputs 196 to the comparator 195 connect the patrol number selected by the thumbwheel 132 on the vehicle keyboard 30. If the patrol car number stored in the shift register 183 corresponds to the patrol car number selected on the vehicle keyboard, a signal is applied at the output 197 of comparator 195 to one input of AND gate 198. A second input of this AND gate is connected to output 190 of AND gate 189. Simultaneous inputs on 190 and 197 to AND gate 198 produce a signal on its output 199 which cause a horn 200 to honk in the patrol vehicle advising the patrolman that a message encoding his patrol car number has been received from headquarters. In addition, the signal on output 199 is applied to latch gate 205. The encoded status message in the shift register 183 is then coupled through plural conductors 206 to the officer keyboard 30 to energize its readout display 207 (FIG. 6).

The signal at the output 199 of AND gate 198 is also applied to the clear input of the one shot multivibrator 174. As a result, this multivibrator is reset and AND gate 170 is disabled. Gate 170 then inhibits entry of any noise or other transient signals from the receiver 39 to the shift register and thus avoids premature shifting out of the information stored therein. AND gate 170 remains disabled until receipt of a subsequent headquarters transmitted signal on antenna 38 at the input of the RF receiver-demodulator 39. Such a signal, as described above, is preceded by a tone of predetermined frequency for energizing the high Q resonant circuit 171 and resultant enabling of AND gate 170 after triggering of one shot multivibrator 174.

What is claimed is:

1. In a vehicle location system wherein stationary wayside stations at field locations are used to reference the field location of said vehicle at a given point in time and wireless paths are used for transmitting digitally encoded messages between said stationary wayside stations and said vehicle, the improvement comprising:
    a radio transmitter located at said field location for re-transmitting said digitally encoded message over a radio channel from said field location to a remote site,
    transmitter control means located at said field location for automatically turning on said radio transmitter upon receipt of said digitally encoded message over said wireless path,
    a radio receiver located at said field location and tuned to the channel over which said messages are transmitted from said field location to said remote site, and
    means located at said field location and responsively coupled to said receiver and operatively coupled to said transmitter control means for automatically delaying transmission of said encoded message to said remote site until said channel is clear so that simultaneous automatic transmissions on the same radio frequency channel are avoided.

2. In the vehicle location system of claim 1 wherein:
    said radio receiver includes a squelch system for providing an output signal indicative that said channel is clear, and
    means responsive to said output signal for inhibiting transmission of said encoded message to said remote site until said output signal is received.

* * * * *